United States Patent
Zimmer et al.

(10) Patent No.: US 6,742,216 B2
(45) Date of Patent: Jun. 1, 2004

(54) WIPING DEVICE, IN PARTICULAR FOR A MOTOR VEHICLE

(75) Inventors: Joachim Zimmer, Sasbach (DE); Harald Rapp, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 196 days.

(21) Appl. No.: 10/051,879

(22) Filed: Jan. 17, 2002

(65) Prior Publication Data

US 2002/0112307 A1 Aug. 22, 2002

(30) Foreign Application Priority Data

Feb. 21, 2001 (DE) .......................... 101 08 183

(51) Int. Cl.[7] .............. B60S 1/32; B60S 1/34
(52) U.S. Cl. ................................. 15/250.351
(58) Field of Search ............. 15/250.351, 250.352, 15/250.34, 250.19, 250.21, 250.202

(56) References Cited

U.S. PATENT DOCUMENTS

| | | | | | |
|---|---|---|---|---|---|
| 1,920,145 A | * | 7/1933 | Hueber | ................... | 15/250.34 |
| 3,149,361 A | * | 9/1964 | Ziegler | ................... | 15/250.351 |
| 3,427,676 A | * | 2/1969 | Riester | ................... | 15/250.352 |
| 4,750,235 A | * | 6/1988 | Scorsiroli | ............. | 15/250.352 |
| 5,239,726 A | * | 8/1993 | Bianco | ...................... | 15/250.4 |

FOREIGN PATENT DOCUMENTS

EP     0 579 550 B1     10/1996

* cited by examiner

*Primary Examiner*—Gary K. Graham
(74) *Attorney, Agent, or Firm*—Michael J. Striker

(57) ABSTRACT

A wiping device for a motor vehicle has a wiper arm having at least one mounting part and a hinge part articulated on the mounting part, a pulling element which connects the mounting part with the hinge part, the hinge part having substantially a profile with a base and at least one lateral flank, a strip extending from the lateral flank, the pulling element being articulated on the strip, the strip extending from an edge of the lateral flank which faces away from the base and extending toward the base so as to enclose an angle with the lateral flank, the lateral flank forming with at least one region of the strip an angle which is smaller than 45°.

12 Claims, 2 Drawing Sheets

WIPING DEVICE, IN PARTICULAR FOR A MOTOR VEHICLE

BACKGROUND OF THE INVENTION

The present invention relates to wiping devices for motor vehicles.

Numerous wiping devices are known in the art. One of such wiping devices is disclosed for example in the European patent document EP 0 579 550. In this wiping device the abutment force applied with the wiping blade against a windshield of a motor vehicle is provided by a spring which is mounted on a wiper arm. The wiper arm has for this purpose a substantially elongated hinge part, and the wiper blade is articulately mounted on its one end. At the other end the hinge part is articulately connected with a mounting part which is non rotatably mounted on the wiper shaft of the wiping device.

For producing the abutment force a pulling spring is tensioned between the hinge part and the mounting part at the side of the articulated connection which faces the windshield. For this purpose the mounting part has a pin, in which one side of a C-shaped bracket is hooked. At the other side of the bracket the end of the pulling spring is hooked. The hinge part also has a pin or a strip for mounting of the pulling spring.

Since the pulling spring however partially extends outwardly beyond the lower edge of the hinge part, an unfavorable flow course is obtained in condition of high traveling speeds. Moreover, the pulling spring is subjected to the action of all weather influences and therefore its service life is shortened.

SUMMARY OF THE INVENTION

Accordingly, it is an object of the present invention to provide a wiping device for a vehicle, which avoids the disadvantages of the prior art.

In keeping with these objects and with others which will become apparent hereinafter, one feature of the present invention resides, briefly stated, in a wiping device which has at least one mounting part and a hinge part articulated on said mounting part; a pulling element which connects said mounting part with said hinge part, said hinge part having substantially a profile with a base and at least one lateral flank; a strip extending from said lateral flank, said pulling element being articulated on said strip, said strip extending from an edge of said lateral flank which faces away from said base and extending toward said base so as to enclose an angle with said lateral flank, said lateral flank forming with at least one region of said strip an angle which is smaller than 45°.

When the wiping device is designed in accordance with the present invention, it has the advantage that due to a small angle between a lateral flank of the wiper arm and a mounting strip of the spring, the spring can be arranged completely in the interior of the profile. Thereby the pulling means are protected from weather influences and moreover no foreign bodies are located in the flow course.

In accordance with the present invention it is especially advantageous when the strip is of one piece with the hinge part. Therefore the strip and the hinge part can be produced as a single part in punching-bending technique.

The strip can be also formed so that two regions are produced, wherein the first region forms an angle smaller than 45°, in particular between 20 and 40°, and preferably less than 30° with the lateral flank, while the second region is formed so that it has a plane extending substantially perpendicular to the lateral flank and/or parallel to a base. Therefore the pulling means can be mounted without torsion loading on the second region of the strip.

When the pulling means engage on the second region of the strip, then it can be connected with the strip without a torsion loading, when the other end of the pulling means is mounted perpendicular or parallel to the lateral flank on the mounting part.

In accordance with another feature of the present invention the hinge part can be formed as a bending-punching part and can have a substantially U-shaped profile in a cross-section. Therefore the pulling means can be completely covered within the U-shaped profile.

It is especially advantageous when the pulling means is formed as a pulling spring. The pulling springs are cost-favorable mass produced articles and can be produced with a corresponding quality.

It is also especially advantageous when the pulling spring is articulately connected to the strip so that it is released from torsion load. This significantly increases the service life as well as the long term stability of the pulling spring.

The strip can have an opening in which the pulling spring can be hooked, so that the pulling spring can be connected with the hinge part in a series manufacture in a simple, fast and reliable manner. Moreover the shape and/or the arrangement of the opening can be varied individually in dependence on the length of the spring or the spring constant.

The strip can have a notch in which the pulling spring can be suspended. Therefore no openings or punched-out passages are needed. Thereby higher costs are avoided and material is saved.

It is especially advantageous when the pulling means in the region of the strip does not extend parallel to the base of the plane of the profile beyond an edge of the lateral flank which faces away from the base. In this case it is guaranteed that no unfavorable flow courses are formed in the region of the strip and furthermore the pulling means are protected from weather influences.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
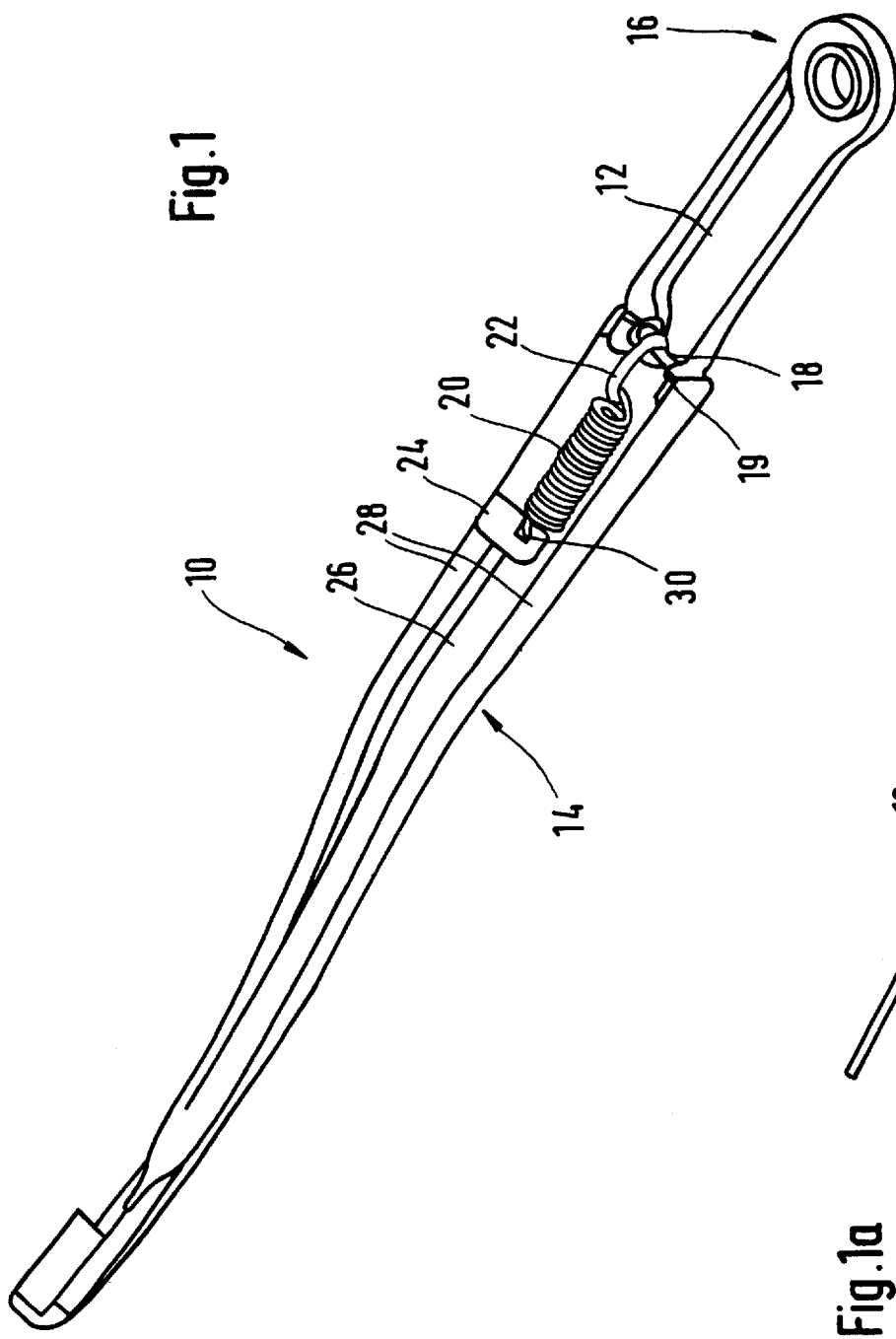
FIG. 1 is a view showing a wiper arm of the inventive wiping device in accordance with the present invention.
Figure 1A:
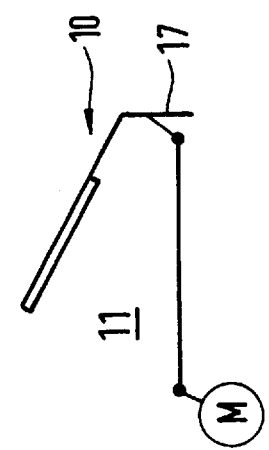
FIG. 1a is a view schematically showing a wiping device in accordance with the present invention.

FIG. 1 shows a wiper arm 10 of an inventive wiping device 11 illustrated in FIG. 1 in a perspective view. The wiper arm 10 is composed substantially of a mounting part 12 and the hinge part 14, and is substantially elongated. The mounting part 12 at one end of its elongation has an eye 16. It is non rotatably mounted by the eye 16 on a wiper shaft 17 of the wiping device 11.

The mounting part 12 further has at its end which faces away from the eye 14, a substantially U-shaped profile. At this end the mounting part 12 is movably connected with the hinge part 16. It has in its region also a substantially U-shaped profile. The movable connection between the mounting part 12 and the hinge part 16 is performed by a pin 18. The pin 18 allows a rotary movement around an axis extending concentrically to the pin 18. For producing a torque or a force at the end of the hinge part 14 which faces away from the mounting part 12, the hinge part 16 is connected additionally with a pulling element 20 which is formed as a pulling spring. The pulling element 20 is connected for this purpose with a further pin 19 through a C-shaped bracket 22, and at the other end is suspended on the hinge part 16. The further pin 19 extends in the region of the pin 18 parallel to it at the side of the mounting part 12 which faces away from the windshield. It extends transversely to the mounting part 12. As can be seen from FIG. 1 the further pin 19 covers the pin 18.

The hinge part 16 has a substantially U-shaped profile, which is composed of a base 26 and two lateral flanks 28 arranged substantially perpendicular to the base 26. One of the lateral flanks 28 at its edge facing away from the base 26 is provided with a strip 24 having a punched hole 30. The pulling element 27 is suspended in the hole.

Figure 2:
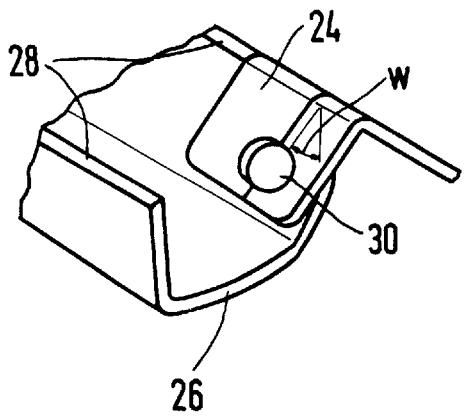
FIG. 2 is a view showing a perspective cross-section through a hinge part of the inventive device.

The region of the strip 24 is shown in a perspective sectional view in FIG. 2. The strip 24 is bent of one piece from the lateral flank 28 and extends from the edge of the lateral flank 28 facing away from the base in direction toward the base 26. The angle W which the lateral flank 28 forms with the plane defined by the strip 24 is smaller than 45° in accordance with the present invention. In particular this angle W must be between 20 and 40° preferably smaller than 30°. Thereby the pulling element 20 is completely located inside the U-shaped profile. In other words it extends fully between the base and the edges of the lateral flank 28 facing away from the base.

Figure 3:
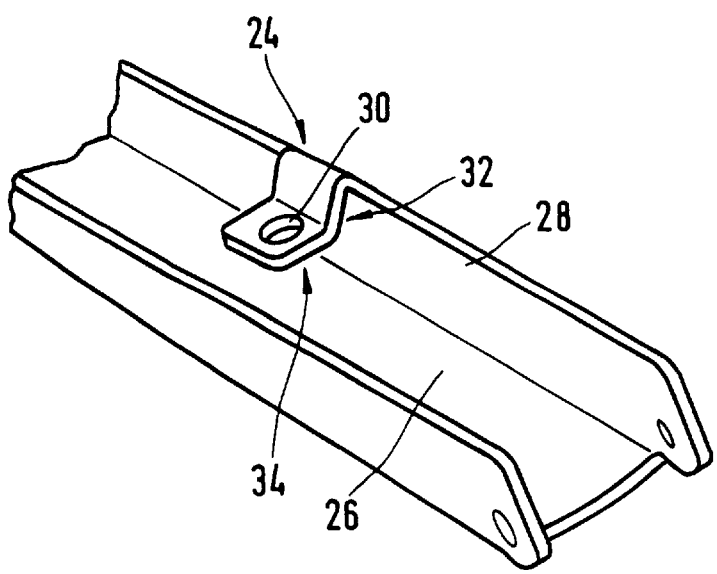
FIG. 3 is a view showing an end of a hinge part of the inventive wiping device in a perspective.

FIG. 3 shows a variation of the embodiment shown in FIG. 2. In this variation the strip 24 is subdivided substantially into two regions. A first region 32 forms an angle of substantially 25° with the lateral flank 28 and a second region 34 is bent so that it extends substantially parallel to the lateral flank 28 or approximately parallel to the base 26. A hole 30 is provided in the second region 34 and the pulling spring 20 is suspended in it.

The region of the strip 24, or in other words the mounting region in which the pulling element 20 is mounted in the hinge part 14, must definitely enclose with the lateral flank 28 an exact angle which is required for suspending the pulling element 20 in a torsion stress free manner. Since in the conventional pulling springs the mounting hooks at the ends are frequently formed parallel or perpendicular to one another, the mounting region of the strip 24 must be formed perpendicular or parallel to the lateral flank 28, since the further pin 19 is arranged as a rule substantially perpendicular to the lateral flank 28.

Naturally also three, four or more regions in the strip 24 can be provided. In particular for smaller hinge parts 14 not one step, but two steps can be bent on the strip 24. Then finally naturally the central region of the strip 24 can form the angle W with the lateral flank 28.

Figure 4:
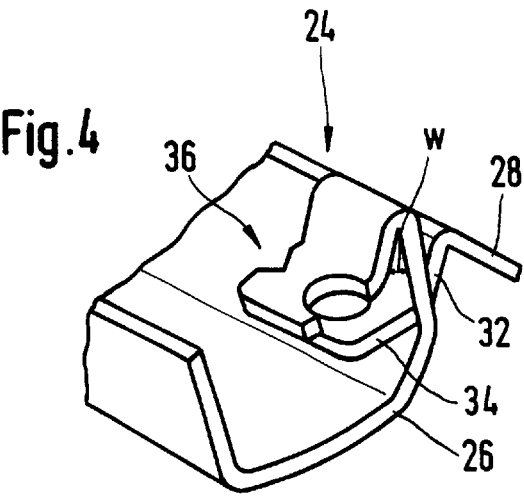
FIG. 4 is a perspective cross-section through an end part of an inventive wiping device.

FIG. 4 shows this variation in a perspective sectioned view. The strip 24 with the first region 32 and the second region 34 is formed of one piece with the lateral flank 28. The first region 32 of the strip 24 and the lateral flank 28 include an angle W which amounts to substantially 25°. The plane formed by the second region 34 is arranged substantially parallel to the base 26.

The hole hinge part 16, including the strip 24 with the first region 32 and the second region 34, is produced by a punching-bending technique.

A further possibility to form the strip 24 resides in that it can be connected in a bridge-like manner with the both lateral flanks 28 of the hinge part 14. Thereby a spraying water hose of the wiping-washing operation can be guided in the interior of the U-shaped profile of the hinge part 14. In a variation, the strip 24 can be selected so that the elastic hose is pressed between the strip 24 and the lateral flame 28 facing away from the strip 24 and subsequently can be removed from the interior of the profile. In accordance with another option the distance between the strip 24 and the lateral flank 28 facing away from the strip 24 can be formed smaller than the hose diameter.

It will be understood that each of the elements described above, or two or more together, may also find a useful application in other types of constructions differing from the types described above.

While the invention has been illustrated and described as embodied in wiping device, in particular a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A wiping device for a motor vehicle, comprising a wiper arm having at least one mounting part and a hinge part articulated on said mounting part; a pulling element which connects said mounting part with said hinge part, said hinge part having substantially a profile with a base and at least one lateral flank; a strip extending from said lateral flank, said pulling element being articulated on said strip, said strip extending from an edge of said lateral flank which faces away from said base and extending toward said base so as to enclose an angle with said lateral flank, said lateral flank forming with at least one region of said strip an angle which is smaller than 45°.

2. A wiping device as defined in claim 1, wherein said angle between said lateral flank and said at least one region of said strip is between 20° and 40°.

3. A wiping device as defined in claim 1, wherein said angle between said lateral flank and said at least one region of said strip is smaller than 30°.

4. A wiping device as defined in claim 1, wherein said strip is formed of one piece with said hinge part.

5. A wiping device as defined in claim 1, wherein said strip has a first region and a second region, said first region forming with said lateral flank an angle of smaller than 45°, said second region having a plane which has an orientation selected from the group consisting of a substantially perpendicular orientation to said lateral flank and substantially parallel orientation to said base.

6. A wiping device as defined in claim 5, wherein said pulling element engages said second region of said strip.

7. A wiping device as defined in claim 1, wherein said hinge part is formed as a bending-punching produced part and has a cross-section with a substantially U-shaped profile.

8. A wiping device as defined in claim 1, wherein said pulling element is formed as a pulling spring.

9. A wiping device as defined in claim 8, wherein said pulling spring is articulated on said strip so as to be relieved from a torsion load.

10. A wiping device as defined in claim 8, wherein said strip has a hole in which said pulling spring is suspended.

11. A wiping device as defined in claim 8, wherein said strip has a notch in which said pulling spring is suspended.

12. A wiping device as defined in claim 1, wherein pulling element in a region of said strip does not extend beyond a plane of said profile which is parallel to said base and extends from an edge of said lateral flank facing away from said base.

* * * * *